(12) United States Patent
Tsuruya

(10) Patent No.: US 7,138,787 B2
(45) Date of Patent: Nov. 21, 2006

(54) DC/DC CONVERTER

(75) Inventor: Mamoru Tsuruya, Niiza (JP)

(73) Assignee: Sanken Electric Co., Ltd., Niiza (JP)

( * ) Notice: Subject to any disclaimer, the term of this patent is extended or adjusted under 35 U.S.C. 154(b) by 0 days.

(21) Appl. No.: 11/350,769

(22) Filed: Feb. 10, 2006

(65) Prior Publication Data

US 2006/0208712 A1  Sep. 21, 2006

(30) Foreign Application Priority Data

Mar. 16, 2005  (JP) .............................. 2005-075616

(51) Int. Cl.
*G05F 1/613* (2006.01)
*G05F 1/24* (2006.01)
(52) U.S. Cl. ...................... 323/225; 323/233; 323/261; 323/293
(58) Field of Classification Search ........ 323/222–225, 323/229, 232, 233, 259, 261, 262, 284, 290, 323/293; 363/16, 89, 250
See application file for complete search history.

(56) References Cited

U.S. PATENT DOCUMENTS

| | | | | |
|---|---|---|---|---|
| 5,418,709 A | * | 5/1995 | Lukemire | .................... 323/222 |
| 6,191,965 B1 | * | 2/2001 | Matsumoto | .................... 363/89 |
| 2005/0047175 A1 | * | 3/2005 | Kawasaki et al. | ............. 363/16 |

FOREIGN PATENT DOCUMENTS

JP  2000-308337  11/2000

OTHER PUBLICATIONS

U.S. Appl. No. 11/350,823, filed Feb. 10, 2006, Tsuruya.

* cited by examiner

*Primary Examiner*—Jessica Han
(74) *Attorney, Agent, or Firm*—Oblon, Spivak, McClelland, Maier & Neustadt, P.C.

(57) ABSTRACT

A DC/DC converter according to the present invention includes first and second transformers, each including a primary winding and a secondary winding, the primary winding including first and second windings, a first diode connected to both ends of a series circuit including the DC power supply, a first switch, and the first winding of the first transformer, a second diode connected to both ends of a series circuit including the DC power supply, a second switch, and the first winding of the second transformer, a first series circuit connected to both ends of the first diode, the first series circuit including the second winding of the first transformer and a smoothing capacitor, a second series circuit connected to both ends of the second diode, the second series circuit including the second winding of the second transformer and the smoothing capacitor, a reactor connected to both ends of a series circuit including the secondary winding of the first transformer and the secondary winding of the second transformer, and a control circuit which turns on and off the first and second switches with a phase difference of half a cycle.

8 Claims, 6 Drawing Sheets

DC/DC CONVERTER

BACKGROUND OF THE INVENTION

1. Field of the Invention

The present invention relates to DC/DC converters with a high step-down ratio, and particularly to technologies for downsizing the same.

2. Description of the Related Art

FIG. 1 is a circuit configuration diagram of a conventional DC/DC converter. This DC/DC converter is described in JP2000-308337 A. The DC/DC converter shown in FIG. 1 is a converter for large output current and low output voltage (a converter for a CPU, for example). In order to improve the response and allow a large electric current to flow, two converters are connected in parallel in the DC/DC converter, the converters operating with a 180° phase shift.

A diode D1 is connected to both ends of a DC power supply Vdc1 through a switch Q1 comprised of a MOSFET or the like. A diode D2 is connected to both ends of the DC power supply Vdc1 through a switch Q2 comprised of a MOSFET or the like. A series circuit including a reactor L1 and a smoothing capacitor C1 is connected to both ends of the diode D1. A series circuit including a reactor L2 and the smoothing capacitor C1 is connected to both ends of the diode D2. A load RL is connected across the smoothing capacitor C1.

The switch Q1, the diode D1, and the reactor L1 constitute a first converter. The switch Q2, the diode D2, and the reactor L2 constitute a second converter.

A control circuit 100 causes the high-frequency switching operation of the switches Q1 and Q2 with a 180° phase shift (half a cycle).

Next, an operation of the conventional DC/DC converter thus configured will be described with reference to a timing chart of signals shown in FIG. 2.

At a time $t_{30}$, once the switch Q1 is turned on by a Q1 control signal Q1g from the control circuit 100, an electric current flows through a path from a positive side of the DC power supply Vdc1, to the switch Q1, to the reactor L1, to the smoothing capacitor C1, and then to a negative side of the DC power supply Vdc1. Accordingly, an electric current Q1i in the switch Q1 linearly increases. At the same time, an electric current L1i in the reactor L1 also linearly increases.

At a time $t_{31}$, once the switch Q1 is turned off by the Q1 control signal Q1g from the control circuit 100, the electric current Q1i in the switch Q1 rapidly becomes zero. At this time, the energy stored in the reactor L1 causes an electric current to flow through a path from the reactor L1, to the smoothing capacitor C1, to the diode D1, and then to the reactor L1. Accordingly, the energy is supplied to the load RL via the smoothing capacitor C1. The electric current L1i in the reactor L1 also decreases from its peak value with a gradient corresponding to the difference value between the input voltage and the output voltage.

At a time $t_{32}$, once the switch Q2 is turned on by a Q2 control signal Q2g from the control circuit 100, an electric current Q2i in the switch Q2 linearly increases. At the same time, an electric current L2i in the reactor L2 also linearly increases.

At a time $t_{33}$, once the switch Q2 is turned off by the Q2 control signal Q2g from the control circuit 100, the electric current Q2i in the switch Q2 rapidly becomes zero. At this time, the energy stored in the reactor L2 causes an electric current to flow through a path from the reactor L2, to the smoothing capacitor C1, to the diode D2, and then to the reactor L2. Accordingly, the energy is supplied to the load RL via the smoothing capacitor C1. The electric current L2i in the reactor L2 also decreases from its peak value with a gradient corresponding to the difference value between the input voltage and the output voltage. The operation carried out at a time $t_{34}$ is similar to that carried out at the time $t_{30}$.

However, the DC/DC converter shown in FIG. 1 requires two reactors L1 and L2. In addition, if a perfect symmetry between the two converters inclusive of the circuit wiring cannot be maintained, the electric currents in these converters cannot be balanced, and the uneven loss will be caused. Moreover, a correction circuit or the like, which carries out correction in order that the electric currents in the converters are balanced, becomes necessary, which has resulted in a disadvantage that the circuit becomes complicated.

SUMMARY OF THE INVENTION

An object of the present invention is to provide a step-down DC/DC converter with which the circuit can be simplified, and which DC/DC converter can thus be downsized.

A first mode of the present invention is a DC/DC converter for reducing a voltage of a DC power supply, the DC/DC converter comprises first and second transformers, each including a primary winding and a secondary winding, the primary winding including first and second windings, a first diode connected to both ends of a series circuit in which the DC power supply, a first switch, and the first winding of the first transformer are connected in series, a second diode connected to both ends of a series circuit in which the DC power supply, a second switch, and the first winding of the second transformer are connected in series, a first series circuit connected to both ends of the first diode, the first series circuit including the second winding of the first transformer and a smoothing capacitor, a second series circuit connected to both ends of the second diode, the second series circuit including the second winding of the second transformer and the smoothing capacitor, a reactor connected to both ends of a series circuit in which the secondary winding of the first transformer and the secondary winding of the second transformer are connected in series, and a control circuit which turns on and off the first and second switches with a phase difference of half a cycle.

A second mode of the present invention is a DC/DC converter for reducing a voltage of a DC power supply, the DC/DC converter comprises first and second transformers, each including a primary winding and a secondary winding, the primary winding including first and second windings, a third switch connected to both ends of a series circuit in which the DC power supply, a first switch, and the first winding of the first transformer are connected in series, a fourth switch connected to both ends of a series circuit in which the DC power supply, a second switch, and the first winding of the second transformer are connected in series, a first series circuit connected to both ends of the third switch, the first series circuit including the second winding of the first transformer and a smoothing capacitor, a second series circuit connected to both ends of the fourth switch, the second series circuit including the second winding of the second transformer and the smoothing capacitor, a reactor connected to both ends of a series circuit in which the secondary winding of the first transformer and the secondary winding of the second transformer are connected in series, and a control circuit which turns on and off the first and second switches with a phase difference of half a cycle, turns on and off the third and first switches complementarily, and turns on and off the fourth and second switches complementarily.

In the first and second modes of the present invention, once the first switch is turned on, an electric current flows through the smoothing capacitor via the primary winding of the first transformer. A voltage is then generated across the secondary winding of the first transformer, and energy is stored in the reactor. The energy stored in the reactor causes a voltage to be generated across the primary winding of the second transformer via the secondary winding of the second transformer. An electric current then flows through a path from the second winding of the second transformer, to the smoothing capacitor, to the second diode (or the fourth switch), and then to the second winding of the second transformer, and the energy is thus returned to the smoothing capacitor.

On the other hand, once the second switch is turned on, an electric current flows through the smoothing capacitor via the primary winding of the second transformer. A voltage is then generated across the secondary winding of the second transformer, and energy is stored in the reactor. The energy stored in the reactor causes a voltage to be generated across the primary winding of the first transformer via the secondary winding of the first transformer. An electric current then flows through a path from the second winding of the first transformer, to the smoothing capacitor, to the first diode (or the third switch), and then to the second winding of the first transformer, and the energy is thus returned to the smoothing capacitor. In other words, the frequency at the reactor as an energy storage element is doubled, so that the reactor can be downsized. In addition, the current balance between the two converters is achieved.

Additionally, a turns ratio A defined as A=np/np1=(np1+np2)/np1 is adjusted, where a number of turns of the primary winding, a number of turns of the first winding and a number of turns of the second winding of each of the first and second transformers are np, np2 and np1, respectively.

With the present invention, by adjusting the turns ratio of the transformers, the conduction angle of each of the switches can be optimized, and the current which flows through the switches can therefore be reduced. In addition, it is possible to use small switching elements, to reduce the loss, and to achieve a high efficiency. Moreover, the current balance between the two converters can be achieved.

Additionally, the DC/DC converter according to the present invention further comprises a core in which a closed magnetic circuit is formed, the core having first, second and third legs, wherein the primary winding of the first transformer is wound around the first leg of the core, the primary winding of the second transformer is wound around the second leg of the core, and a gap is formed in the third leg of the core.

With the present invention, by using the core having three legs, the first and second transformers and the reactor are integrated, so that the circuit can be simplified, and the DC/DC converter can be further downsized and improved in efficiency.

Additionally, the DC/DC converter according to the present invention further comprises a core in which a closed magnetic circuit is formed, the core having a plurality of legs, wherein first and second coils are wound around one of the plurality of legs of the core, the first coil comprised of the primary winding of the first transformer, and the second coil comprised of the primary winding of the second transformer, and a magnetic shunt is provided between the first and second coils.

With the present invention, the coupling between the first and second coils is excellent, and almost all of the magnetic flux generated by these coils passes through the magnetic shunt. For this reason, the inductance can be adjusted over a wide range by changing the gap of the magnetic shunt. Accordingly, for an application in which a large peak current flows, the DC/DC converter can be used without core saturation by setting the gap large.

DESCRIPTION OF THE PREFERED EMBODIMENT

Detailed description will be given below of several embodiments of DC/DC converters according to the present invention with reference to the drawings.

The DC/DC converter of each of the embodiments is characterized in that, by the use of two transformers, outputs from the two converters are combined to double the frequency thereof and applied to a reactor, so that the reactor as an energy storage element is downsized, and the current balance between the converters is achieved.

In addition, in the DC/DC converter, a primary winding of the transformer is provided with a tap, so that the primary winding is constituted of a first winding and a second winding, and the transformers are thus allowed to operate as autotransformers. In the case of a converter with a high step-down ratio, duty factors of switch elements (switches) are increased to downsize the converter, and to improve the efficiency thereof. Moreover, the DC/DC converter is characterized in that a magnetic circuit is devised to integrate the transformers and the reactor, and further downsizing of the circuit is thus achieved.

First Embodiment

Figure 3:
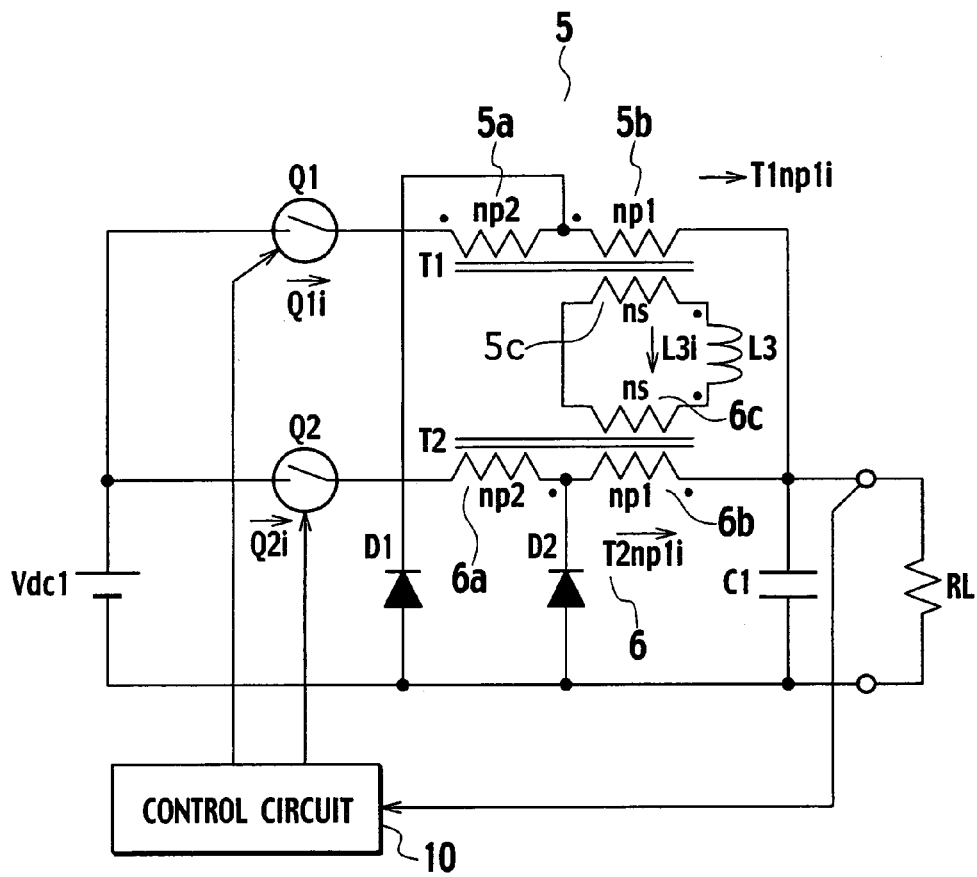
FIG. 3 is a circuit configuration diagram of a DC/DC converter of a first embodiment.

FIG. 3 is a circuit configuration diagram of a DC/DC converter of a first embodiment. The DC/DC converter shown in FIG. 3 is a converter for reducing the voltage of a DC power supply. The DC/DC converter includes the DC power supply Vdc1, a transformer T1 (corresponding to the first transformer of the present invention), a transformer T2 (corresponding to the second transformer of the present invention), a switch Q1 (corresponding to the first switch of the present invention), a switch Q2 (corresponding to the second switch of the present invention), a diode D1 (corresponding to the first diode of the present invention), a diode D2 (corresponding to the second diode of the present invention), a reactor L3 (corresponding to the reactor of the present invention), a smoothing capacitor C1, and a control circuit 10.

The transformer T1 has a primary winding 5 (np=np1+np2 turns) including a first winding 5a (np2 turns) and a second winding 5b (np1 turns) connected to the first winding 5a in series, and a secondary winding 5c (ns turns) electromagnetically coupled to the first and second windings 5a and 5b. The transformer T2 is constructed in the same way as the transformer T1, having a primary winding 6 (np=np1+np2 turns) including a first winding 6a (np2 turns) and a second winding Gb (np1 turns) connected to the first winding 6a in series; and a secondary winding 6c (ns turns) electromagnetically coupled to the first and second windings 6a and 6b.

The diode D1 is connected to both ends of a series circuit in which the DC power supply Vdc1, the switch Q1 comprised of a MOSFET or the like, and the first winding 5a of the transformer T1 are connected in series. The diode D2 is connected to both ends of a series circuit in which the DC power supply Vdc1, the switch Q2 comprised of a MOSFET or the like, and the first winding 6a of the transformer T2 are connected in series.

A series circuit including the second winding 5b of the transformer T1 and the smoothing capacitor C1 is connected to both ends of the diode D1. A series circuit including the second winding 6b of the transformer T2 and the smoothing capacitor C1 is connected to both ends of the diode D2. The reactor L3 is connected to both ends of a series circuit in which the secondary winding 5c of the transformer T1 and the secondary winding 6c of the transformer T2 are connected in series. The control circuit 10 turns on and off the switches Q1 and Q2 depending on the output voltage Vo of the smoothing capacitor C1 with a phase difference of 180°.

The switch Q1, the diode D1, and the transformer T1 constitute a first converter. The switch Q2, the diode D2, and the transformer T2 constitute a second converter.

Description will now be given of an operation of the DC/DC converter of the first embodiment thus configured, with reference to a timing chart shown in FIG. 4.

First of all, at a time $t_0$, the switch Q1 is turned on by a Q1 control signal Q1g from the control circuit 10. Then, an electric current flows through a path from a positive side of the DC power supply Vdc1, to the switch Q1, to the first winding 5a, to the second winding 5b, to the smoothing capacitor C1, and then to a negative side of the DC power supply Vdc1. Accordingly, an electric current Q1$i$ in the switch Q1 linearly increases. At the same time, a voltage is generated also across the secondary winding 5c of the transformer T1, and an electric current L3$i$ flows through the reactor L3 via a path from the secondary winding 5c, to the reactor L3, to the secondary winding 6c, and then to the secondary winding 5c.

This electric current L3$i$ flows in accordance with the law of equal ampere-turns of transformers, causing energy to be stored in the reactor L3. At the same time, the same electric current flows through the secondary winding 6 of the transformer T2. Accordingly, a voltage corresponding to the number of turns is induced across the primary winding 6 of the transformer T2.

The electric current which flows through the primary winding 6 of the transformer T2 is determined by the number of turns np (=np1+np2) of the primary winding 6 and the number of turns ns of the secondary winding 6c. When np is equal to ns, the electric current equal to the electric current Q1$i$ in the switch Q1 flows. In this way, an electric current T2$np1i$=(ns/np1)·Q1$i$=(np/np1)·Q1$i$ flows through the second winding 6b of the transformer T2 via a path from the second winding 6b, to the smoothing capacitor C1, the diode D2, and then to the second winding 6b. Accordingly, the electric current T2$np1i$ also linearly increases. As a result, the electric current which flows through the smoothing capacitor C1 (the load current) becomes IL=Q1$i$+T2$np1i$.

At a time $t_1$, the switch Q1 is turned off by the Q1 control signal Q1g from the control circuit 10. Then, the electric current L3$i$ in the reactor L3 causes an electric current T1$np1i$ equal to the electric current T2$np1i$ to flow through the second winding 5b of the transformer T1 via a path from the second winding 5b, to the smoothing capacitor C1, to the diode D1, and then to the second winding 5b. As a result, the electric current which flows into the smoothing capacitor C1 becomes T1$np1i$+T2$np1i$=2·Q1$i$·(np/np1). From the time $t_1$ to a time $t_2$, the electric current L3$i$ in the reactor L3, the electric current T1$np1i$ in the second winding 5b of the transformer T1, and the electric current T2$np1i$ in the second winding 6b of the transformer T2 linearly decrease.

At the time $t_2$, the switch Q2 is turned on by a Q2 control signal Q2g from the control circuit 10. Then, an electric current flows through a path from the positive side of the DC power supply Vdc1, to the switch Q2, to the first winding 6a, to the second winding 6b, to the smoothing capacitor C1, and then to the negative side of the DC power supply Vdc1. Accordingly, an electric current Q2$i$ in the switch Q2 linearly increases. At the same time, a voltage is generated also across the secondary winding 6c of the transformer T2, and the electric current L3$i$ flows through the reactor L3 via a path from the secondary winding 6c, to the secondary winding 5c, to the reactor L3, and then to the secondary winding 6c.

This electric current L3$i$ flows in accordance with the law of equal ampere-turns of transformers, causing energy to be stored in the reactor L3. At the same time, the same electric current flows through the secondary winding 5 of the transformer T1. Accordingly, a voltage corresponding to the number of turns is induced across the primary winding 5 of the transformer T1.

The electric current which flows through the primary winding 5 of the transformer T1 is determined by the number of turns np (=np1+np2) of the primary winding 5 and the number of turns ns of the secondary winding 5c. When np is equal to ns, the electric current equal to the electric current Q2$i$ in the switch Q2 flows. In this way, an electric current T1$np1i$=(ns/np1)·Q2$i$=(np/np1)·Q2$i$ flows through the second winding 5b of the transformer T1 via a path from the second winding 5b, to the smoothing capacitor C1, to the diode D1, and then to the second winding 5b. Accordingly, the electric current T1$np1i$ also linearly increases. As a result, the electric current which flows through the smoothing capacitor C1 (the load current) becomes IL=Q2$i$+T1$np1i$.

At a time $t_3$, the switch Q2 is turned off by the Q2 control signal Q2g from the control circuit 10. Then, the electric current L3$i$ in the reactor L3 causes an electric current T2$np1i$ equal to the electric current T1$np1i$ to flow through the second winding 6b of the transformer T2 via a path from the second winding 6b, to the smoothing capacitor C1, to the diode D2, and then to the second winding 6b. As a result, the electric current which flows into the smoothing capacitor C1 becomes T1$np1i$+T2$np1i$=2·Q2$i$·(np/np1).

From the time $t_3$ to the time $t_4$, the electric current L3$i$ in the reactor L3, the electric current T1$np1i$ in the second winding 5b of the transformer T1, and the electric current T2$np1i$ in the second winding 6b of the transformer T2 linearly decrease. The operation carried out at the time $t_4$ is similar to that carried out at the time $t_0$.

Figure 1:
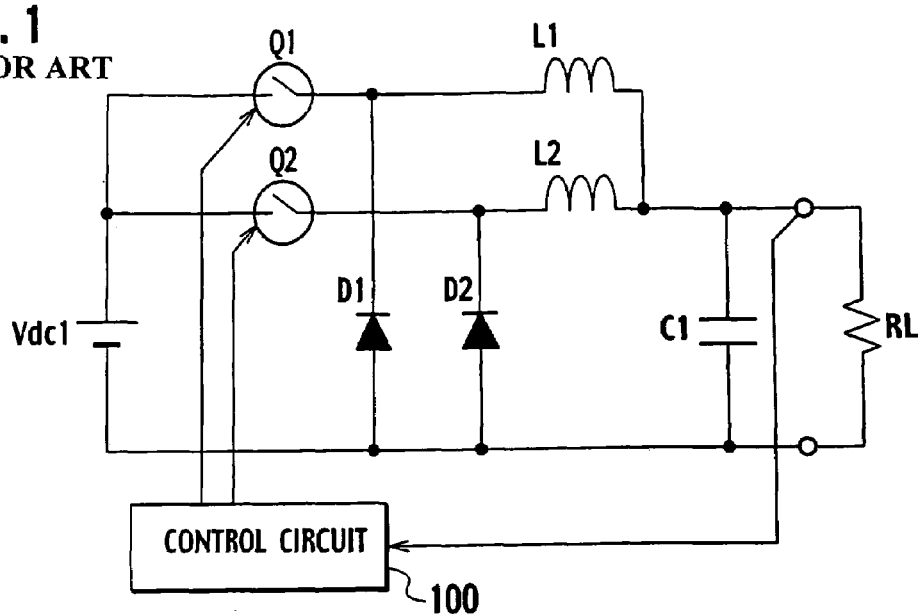
FIG. 1 is a circuit configuration diagram of a conventional DC/DC converter.
Figure 2:
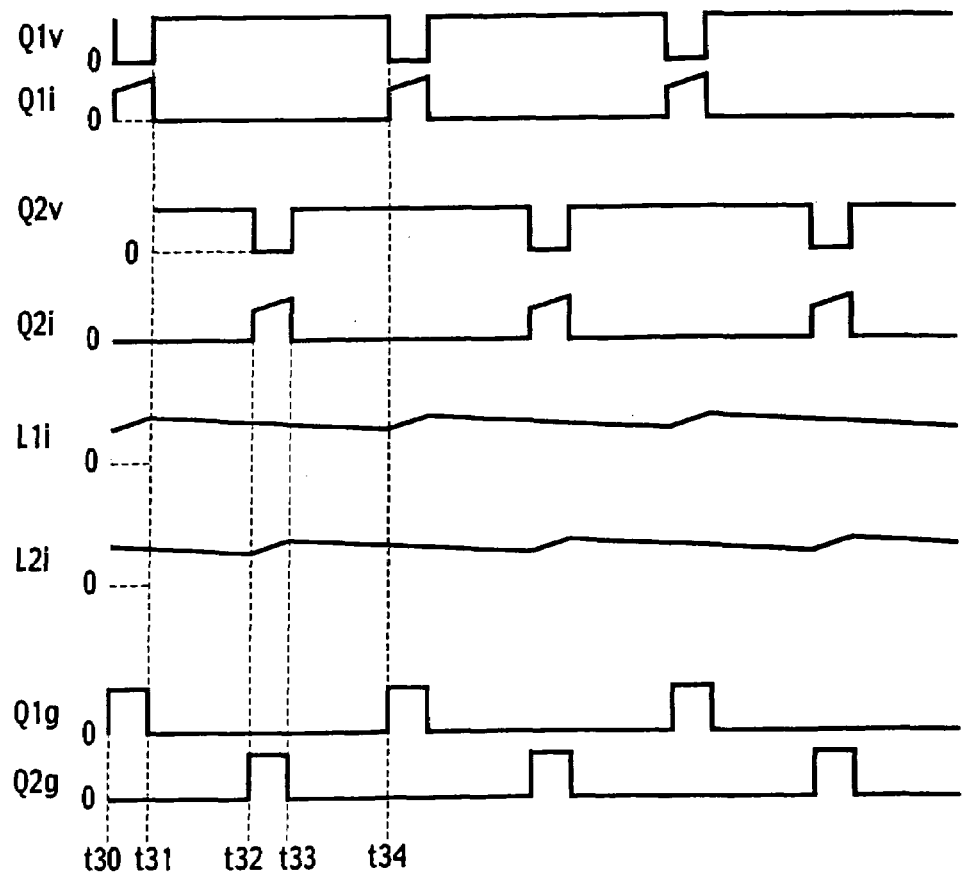
FIG. 2 is a timing chart of signals at respective parts of the conventional DC/DC converter.

Since the switches Q1 and Q2 operate with a 180° phase shift in this way, the reactor L3 is excited alternately. Accordingly, the reactor L3 operates at a frequency which is two times higher than that given when the two reactors L1 and L2 are used as shown in FIG. 1. For this reason, the inductance of the reactor L3 can be reduced. In addition, the electric current which flows through the reactor L3 is substantially equal to the electric current in the switch Q1, and the two reactors L1 and L2 can be replaced with the downsized single reactor L3.

The electric currents which flow through the switches Q1 and Q2 are determined by the electric current in the reactors L3. Since the same transformers are used for the transformers T1 and T2, the electric currents which flow through the switches Q1 and Q2 are equal, and forcibly balanced. In addition, since the transformers T1 and T2 store no energy, these may be small transformers, so that the converter can be downsized as a whole.

In the case where the step-down ratio is high, that is, the output voltage is very low, such as in the case of the DC/DC converter which supplies power to a CPU (Central Processing Unit), the on period of the switch is very short. Accordingly, depending on the positions of the taps of the transformers T1 and T2 (the positions of connection between the first windings 5a and 6a and the second windings 5b and 6b, respectively), the output current IL is substantially equal to 2·T1$np1i$=2·np/np1, that is, the electric current two times larger than np/np1 can be outputted.

When np1 is equal to np2, and np/np1 is therefore equal to 2, the electric current substantially four times larger than the electric current in the switch Q1 or Q2 can be supplied to the load RL. In this case, the on period of the switches Q1 and Q2 is twice as long as the on period applied when np1 is equal to np (the case where there is no tap). Accordingly, by setting the turn ratio A=np/np1 of the transformers T1 and T2 equal to or larger than one (A≧1), it is possible to optimize the on period of the switches Q1 and Q2 of the DC/DC converter with a high step-down ratio.

In other words, by adjusting the turns ratio A of the transformer T1 and the turn ratio A of the transformer T2, it is possible to optimize the conduction angle of each of the switches Q1 and Q2. In addition, it is possible to use small switching elements, to reduce the loss, and to achieve a high efficiency. Moreover, the current balance between the two converters can be achieved.

Second Embodiment

Figure 5:
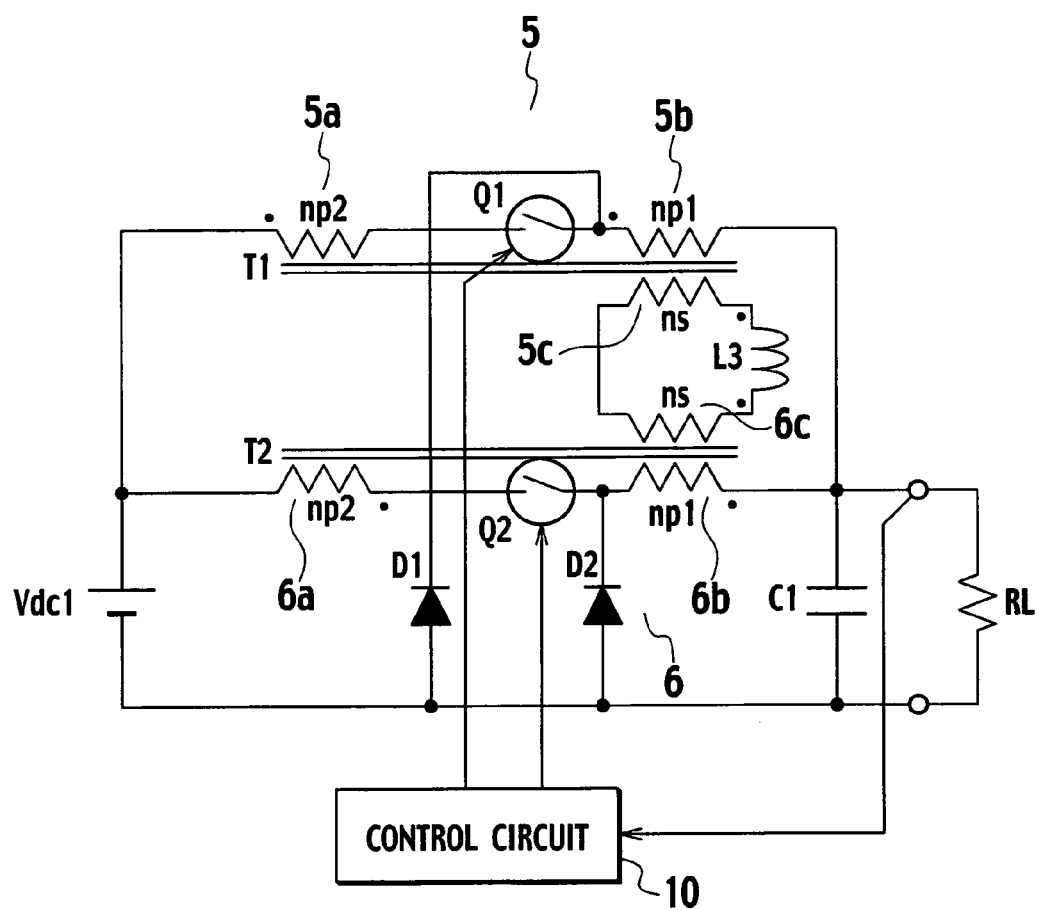
FIG. 5 is a circuit configuration diagram of a DC/DC converter of a second embodiment.

FIG. 5 is a circuit configuration diagram of a DC/DC converter of a second embodiment. The DC/DC converter shown in FIG. 5 is different from the DC/DC converter shown in FIG. 3 in the following point. That is, the switch Q1 is connected between the first winding 5a and the second winding 5b of the transformer T1, and the switch Q2 is connected between the first winding 6a and the second winding 6b of the transformer T2.

In addition, the diode D1 is connected to both ends of a series circuit in which the DC power supply Vdc1, the first winding 5a of the transformer T1, and the switch Q1 are connected in series. The diode D2 is connected to both ends of a series circuit in which the DC power supply Vdc1, the first winding 6a of the transformer T2, and the switch Q2 are connected in series.

Since an operation of the DC/DC converter of the second embodiment thus configured is similar to that of the DC/DC converter shown in FIG. 3, similar effects can be obtained.

In addition, since the switch Q1 and the diode D1 are provided closely, and the switch Q2 and the diode D2 are provided closely, the switches Q1 and Q2 can be integrated with the diodes D1 and D2, respectively. Accordingly, the circuit can be modularized or integrated into an IC.

Third Embodiment

Figure 6:
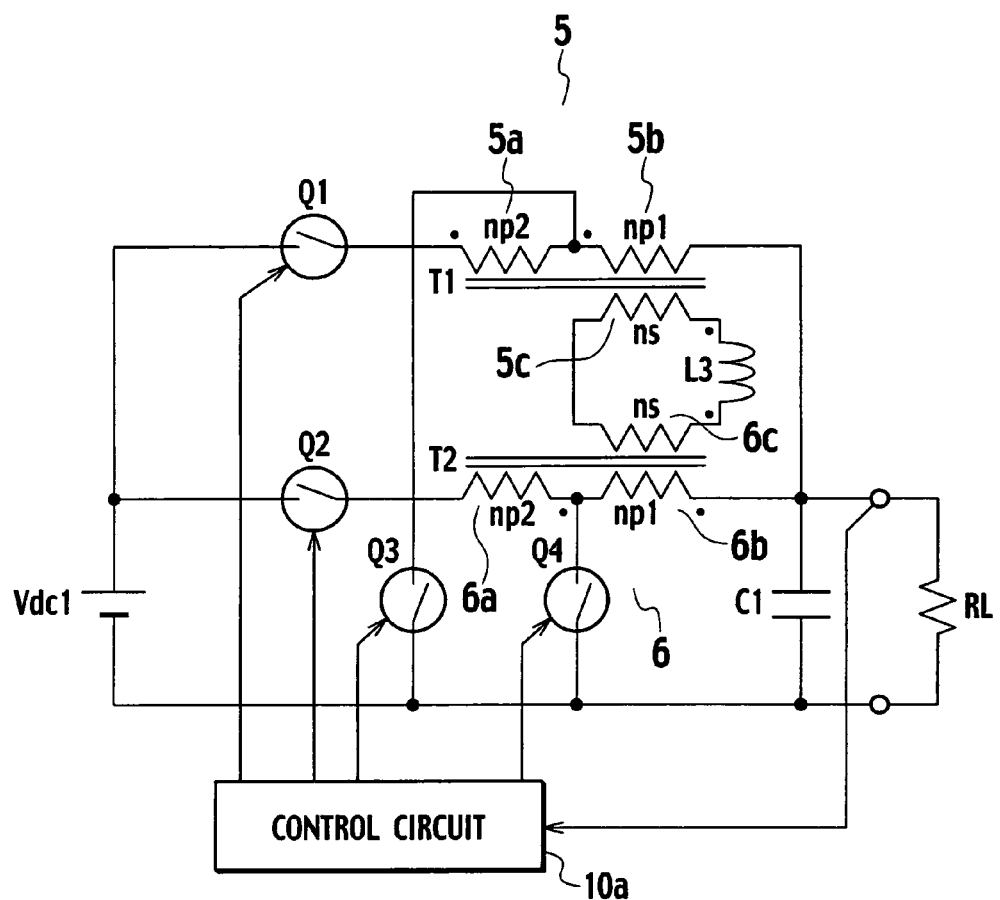
FIG. 6 is a circuit configuration diagram of a DC/DC converter of a third embodiment.

FIG. 6 is a circuit configuration diagram of a DC/DC converter of a third embodiment. The DC/DC converter shown in FIG. 6 is characterized in that, in the DC/DC converter shown in FIG. 3, the diode D1 is replaced with a switch Q3 (corresponding to the third switch of the present invention) comprised of a MOSFET or the like, and the diode D2 is replaced with a switch Q4 (corresponding to the fourth switch of the present invention) comprised of a MOSFET or the like.

A control circuit 10a turns on and off the switches Q1 and Q2 with a phase difference of 180°, turns on and off the switches Q3 and Q1 complementarily, and turns on and off the switches Q4 and Q2 complementarily.

Figure 4:
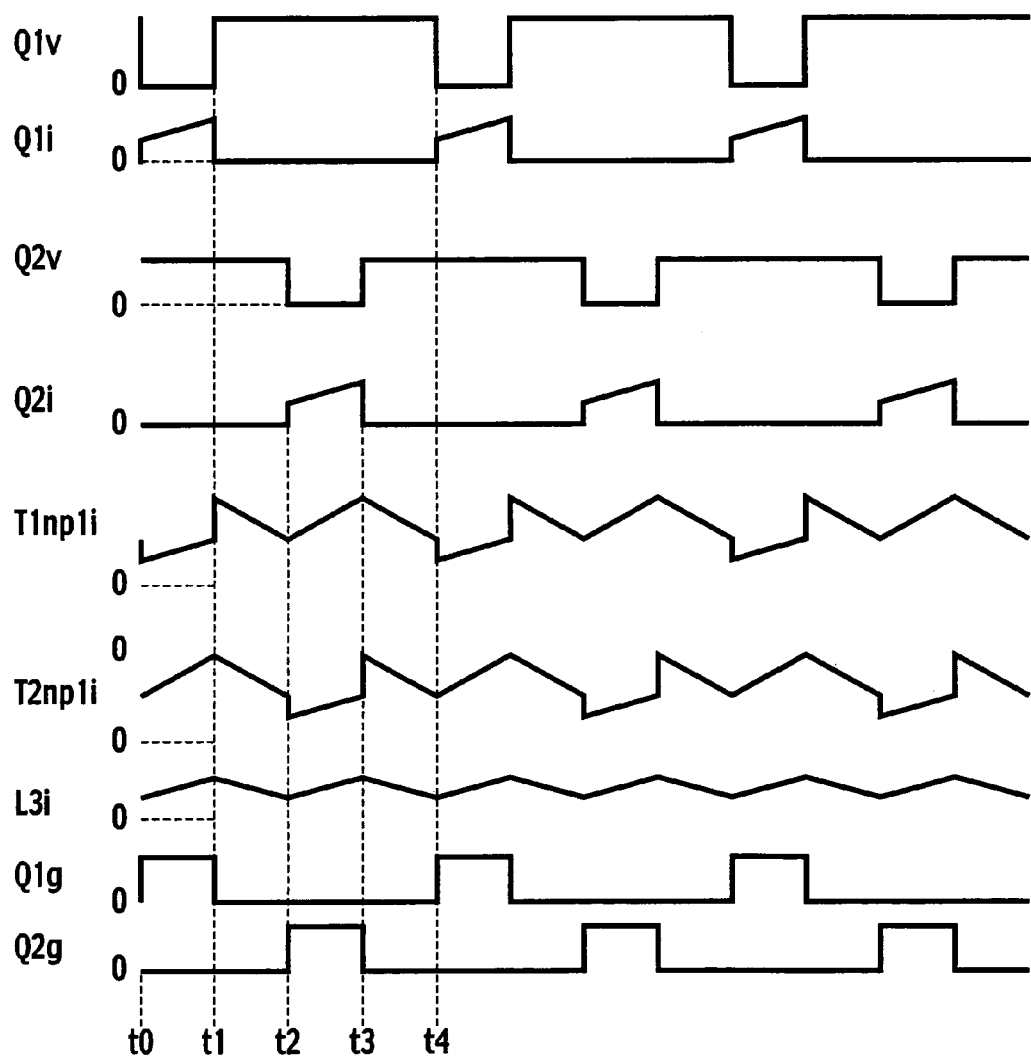
FIG. 4 is a timing chart of signals at respective parts of the DC/DC converter of the first embodiment.

Since an operation of the DC/DC converter of the third embodiment is similar to that carried out in accordance with the timing chart shown in FIG. 4, detailed description of the operation will be omitted. The description of the operation of the third embodiment can be provided by replacing the diode D1 with the switch Q3, and replacing the diode D2 with the switch Q4, in the description of the operation of the first embodiment.

Specifically, the control circuit 10a keeps the switch Q4 turned on while the switch Q1 is turned on, and keeps the switch Q4 turned off while the switch Q1 is turned off. On the other hand, the control circuit 10a keeps the switch Q3 turned on while the switch Q2 is turned on, and keeps the switch Q3 turned off while the switch Q2 is turned off. In this way, an operation similar to that of the DC/DC converter of the first embodiment shown in FIG. 3 is carried out.

With the DC/DC converter of the third embodiment, it is made possible to reduce the loss in the diodes in the case of a low voltage and a large electric current.

Embodiments of Magnetic Circuit with which Transformers and Reactor are Integrated FIGS. 7A to 7E are diagrams showing magnetic circuits with each of which the transformers and the reactor included in any one of the DC/DC converters of the first to third embodiments are integrated. FIGS. 7A to 7E show styles of integrating the transformers and the reactor.

Figure 7A:
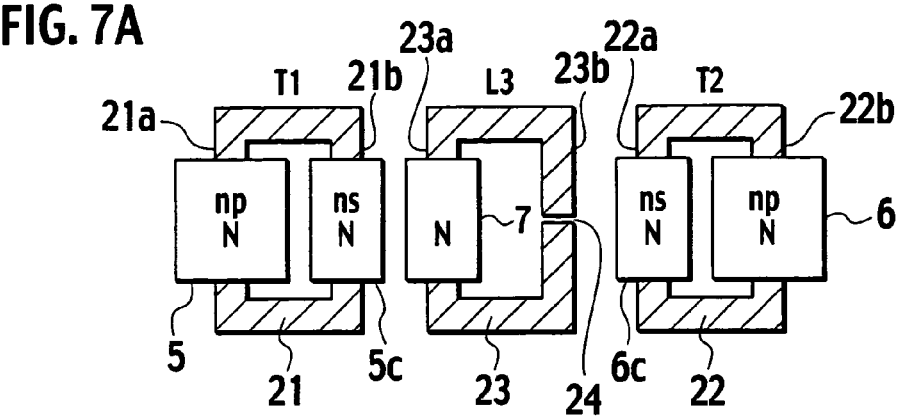
FIG. 7A is a diagram showing transformers T1 and T2, and a reactor L3.

As shown in FIG. 7A, the transformer T1 used in any one of the DC/DC converters of the first to third embodiments has the primary winding 5 (np turns) wound around a first leg 21a of a core 21 in which a closed magnetic circuit is formed, and has the secondary winding 5c wound around a second leg 21b of the core 21, the core being made of a magnetic material. The transformer T2 has the primary winding 6 (np turns) wound around a first leg 22b of a core 22 in which a closed magnetic circuit is formed, and has the secondary winding 6c wound around a second leg 22a of the core 22. The reactor L3 has a winding 7 wound around a first leg 23a of a core 23 which has a gap. The gap 24 is formed in a second leg 23b of the core 23.

Figure 7B:
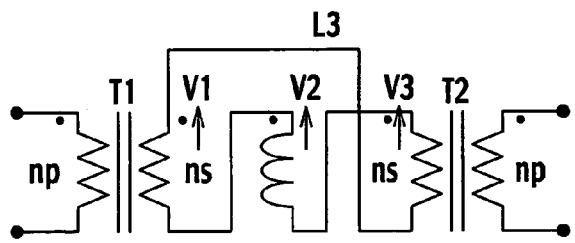
FIG. 7B is a diagram showing an electric connection between the transformer T1, the transformer T2, and the reactor L3.

The transformer T1, the transformer T2, and the reactor L3 are connected as shown in FIG. 7B. Accordingly, there is no change in the operation even if a core shown in FIG. 7C is used, into which the cores of the transformer T1, the transformer T2, and the reactor L3 which are shown in FIG. 7A are integrated.

Figure 7C:
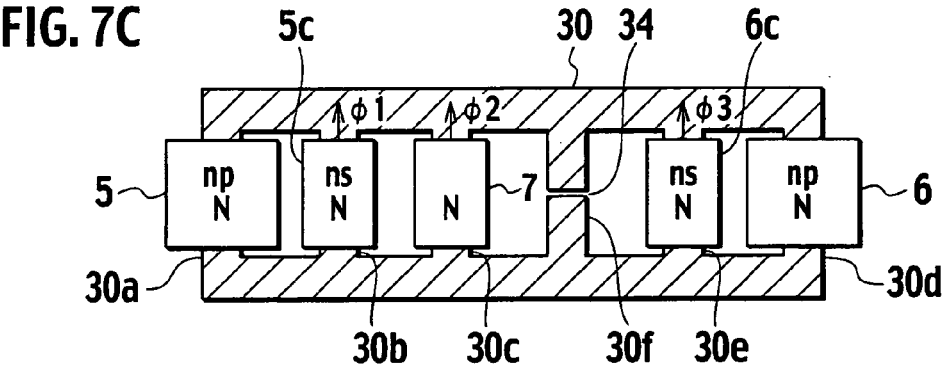
FIG. 7C is a diagram showing a magnetic circuit with which the transformers T1 and T2, and the reactor L3 are integrated.

With regard to a magnetic circuit shown in FIG. 7C, the primary winding 5 of the transformer T1 is wound around a first leg 30a of a core 30 in which a closed magnetic circuit is formed, and the secondary winding 5c of the transformer T1 is wound around a second leg 30b of the core 30. The winding 7 is wound around a third leg 30c. The primary winding 6 of the transformer T2 is wound around a fourth leg 30d. The secondary winding 6c of the transformer T2 is wound around a fifth leg 30e. A gap 34 is formed in a sixth leg 30f. A magnetic flux penetrating the secondary winding 5c of the transformer T1 is $\Phi 1$, a magnetic flux penetrating the winding 7 of the reactor L3 is $\Phi 2$, and a magnetic flux penetrating the secondary winding 6c of the transformer T2 is $\Phi 3$.

The secondary winding 5c (ns turns) of the transformer T1, the secondary winding 6c (ns turns) of the transformer T2 and the reactor L3 are connected in a loop (a closed loop). For this reason, when a voltage across the secondary winding 5c of the transformer T1, a voltage across the winding 7 of the reactor L3 and a voltage across the secondary winding 6c of the transformer T2 are V1, V2 and V3, respectively, the total voltage generated across the windings 5c, 6c and 7 is V1+V2+V3=0.

When the numbers of turns of the windings 5c, 6c and 7 are equal to one another, and are equal to N, since the magnetic flux $\Phi$ through the core around which the windings are wound satisfies $d\Phi/dt=V$, and the sum of the voltages across the windings is equal to zero, the total change in the magnetic flux through the core is also zero. Accordingly, even if the magnetic circuit shown in FIG. 7A is replaced with the magnetic circuit shown in FIG. 7C, since the total magnetic flux is $\Phi 1+\Phi 2+\Phi 3=0$, there is no influence on the operation.

Figure 7D:
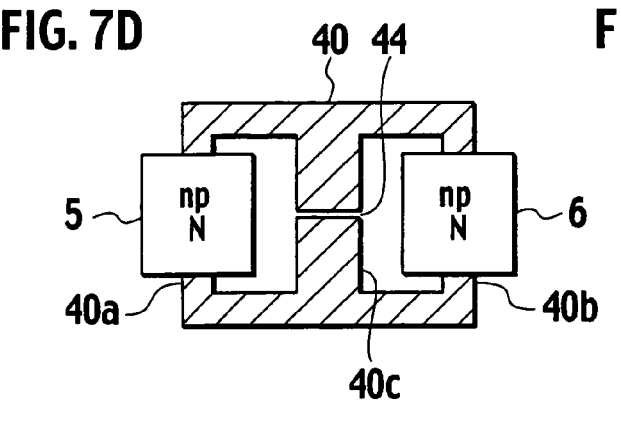
FIG. 7D is a diagram showing a magnetic circuit equivalent to the magnetic circuit shown in FIG. 7C.

Moreover, since $\Phi 1+\Phi 2+\Phi 3=0$, there is no influence on the operation even if a magnetic circuit shown in FIG. 7D is used, in which all of the legs 30b, 30c and 30e through which the magnetic fluxes $\Phi 1$, $\Phi 2$ and $\Phi 3$ pass are removed. With regard to the magnetic circuit shown in FIG. 7D, the primary winding 5 of the transformer T1 is wound around a first leg 40a of a core 40 in which a closed magnetic circuit is formed, the primary winding 6 of the transformer T2 is wound around a second leg 40b, and a gap 44 is formed in a third leg 40c. In other words, the magnetic circuit can be downsized.

By using the core comprised of the three legs in this way, it is made possible to simplify the two transformers and the reactor to simplify the circuit configuration.

Figure 7E:
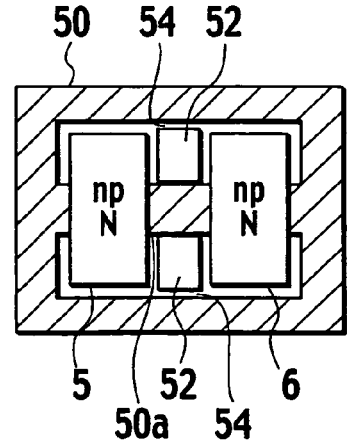
FIG. 7E is a diagram showing a magnetic circuit having a magnetic shunt, with which magnetic circuit the transformers T1 and T2, and the reactor L3 are integrated.

In another form, as shown in FIG. 7E, a first coil comprised of the primary winding 5 of the transformer T1, as well as a second coil comprised of the primary winding 6 of the transformer T2 are wound around a center leg 50a of a core 50 in which a closed magnetic circuit is formed. Between the two coils, a magnetic shunt 52 made of magnetic material is provided. Gaps 54 are formed between the magnetic shunt 52 and outer legs of the core 50.

With regard to the magnetic circuit as shown in FIG. 7E, the coupling between the first and second coils is excellent. Since almost all of the magnetic flux generated by these coils passes through the magnetic shunt 52, the inductance can be adjusted over a wide range by changing the gaps 54 between the magnetic shunt 52 and the legs. Accordingly, for an application in which a large peak current flows, the DC/DC converter can be used without core saturation by setting the gap 54 large.

The present invention is not limited to the DC/DC converters of the first to third embodiments. With regard to the configuration of the second embodiment shown in FIG. 5, for example, the diodes D1 and D2 shown in FIG. 5 may be replaced with the switches Q3 and Q4 shown in FIG. 6, respectively, and the control circuit 10a shown in FIG. 6 may control the switches Q3 and Q4. With this, the effects of the second embodiment as well as the effects of the third embodiment can be obtained.

The present invention is applicable to power circuits for switching power supplies, such as DC/DC converters and AC/DC converters.

What is claimed is:

1. A DC/DC converter for reducing a voltage of a DC power supply, comprising:
    first and second transformers, each including a primary winding and a secondary winding, the primary winding including first and second windings;
    a first diode connected to both ends of a series circuit in which the DC power supply, a first switch, and the first winding of the first transformer are connected in series;
    a second diode connected to both ends of a series circuit in which the DC power supply, a second switch, and the first winding of the second transformer are connected in series;
    a first series circuit connected to both ends of the first diode, the first series circuit including the second winding of the first transformer and a smoothing capacitor;
    a second series circuit connected to both ends of the second diode, the second series circuit including the second winding of the second transformer and the smoothing capacitor;
    a reactor connected across a series circuit in which the secondary winding of the first transformer and the secondary winding of the second transformer are connected in series; and
    a control circuit which turns on and off the first and second switches with a phase difference of half a cycle.

2. The DC/DC converter according to claim 1, wherein a turns ratio A defined as A=np/np1=(np1+np2)/np1 is adjusted, where a number of turns of the primary winding, a number of turns of the first winding and a number of turns of the second winding of each of the first and second transformers are np, np2 and np1, respectively.

3. The DC/DC converter according to claim 1, further comprising:
    a core in which a closed magnetic circuit is formed, the core having first, second and third legs,
    wherein the primary winding of the first transformer is wound around the first leg of the core; the primary winding of the second transformer is wound around the second leg of the core; and a gap is formed in the third leg of the core.

4. The DC/DC converter according to claim 1, further comprising:
- a core in which a closed magnetic circuit is formed, the core having a plurality of legs,
- wherein first and second coils are wound around one of the plurality of legs of the core, the first coil comprised of the primary winding of the first transformer, and the second coil comprised of the primary winding of the second transformer; and a magnetic shunt is provided between the first and second coils.

5. A DC/DC converter for reducing a voltage of a DC power supply, comprising:
- first and second transformers, each including a primary winding and a secondary winding, the primary winding including first and second windings;
- a third switch connected to both ends of a series circuit in which the DC power supply, a first switch, and the first winding of the first transformer are connected in series;
- a fourth switch connected to both ends of a series circuit in which the DC power supply, a second switch, and the first winding of the second transformer are connected in series;
- a first series circuit connected to both ends of the third switch, the first series circuit including the second winding of the first transformer and a smoothing capacitor;
- a second series circuit connected to both ends of the fourth switch, the second series circuit including the second winding of the second transformer and the smoothing capacitor;
- a reactor connected to both ends of a series circuit in which the secondary winding of the first transformer and the secondary winding of the second transformer are connected in series; and
- a control circuit which turns on and off the first and second switches with a phase difference of half a cycle, turns on and off the third and first switches complementarily, and turns on and off the fourth and second switches complementarily.

6. The DC/DC converter according to claim 5,
wherein a turns ratio A defined as $A=np/np1=(np1+np2)/np1$ is adjusted, where a number of turns of the primary winding, a number of turns of the first winding and a number of turns of the second winding of each of the first and second transformers are $np$, $np2$ and $np1$, respectively.

7. The DC/DC converter according to claim 5, further comprising:
- a core in which a closed magnetic circuit is formed, the core having first, second and third legs,
- wherein the primary winding of the first transformer is wound around the first leg of the core; the primary winding of the second transformer is wound around the second leg of the core; and a gap is formed in the third leg of the core.

8. The DC/DC converter according to claim 5, further comprising:
- a core in which a closed magnetic circuit is formed, the core having a plurality of legs,
- wherein first and second coils are wound around one of the plurality of legs of the core, the first coil comprised of the primary winding of the first transformer, and the second coil comprised of the primary winding of the second transformer; and a magnetic shunt is provided between the first and second coils.

* * * * *